United States Patent [19]

Tanaka

[11] Patent Number: 5,780,097
[45] Date of Patent: Jul. 14, 1998

US005780097A

[54] PROCESS FOR PREPARATION OF POWDERY EXTRACT OF SHIITAKE MUSHROOM

[76] Inventor: Yoshio Tanaka, 22 Banchi, Yamaguchi-Cho, Gifu-Shi, Gifu-Ken, Japan

[21] Appl. No.: 712,443

[22] Filed: Sep. 11, 1996

[30] Foreign Application Priority Data

Dec. 25, 1995 [JP] Japan .................. 7-350029

[51] Int. Cl.$^6$ ............................................. A23L 1/28
[52] U.S. Cl. .............................. 426/655; 426/425; 426/473
[58] Field of Search ................................. 426/655, 650, 426/425, 473

[56] References Cited

U.S. PATENT DOCUMENTS

| | | | |
|---|---|---|---|
| 4,143,162 | 3/1979 | Tanaka | 426/89 |
| 4,913,915 | 4/1990 | Tanaka | 426/72 |
| 4,915,961 | 4/1990 | Tanaka | 426/72 |
| 4,915,965 | 4/1990 | Tanaka | 426/282 |

FOREIGN PATENT DOCUMENTS 2236655  4/1991  United Kingdom .

*Primary Examiner*—Anthony J. Weier
*Attorney, Agent, or Firm*—Browdy and Neimark

[57] ABSTRACT

A process for preparation of a powdery extract of a shiitake mushroom including the steps of adding a cyclodextrin solution to a shiitake mushroom extract obtained by concentrating a hot water extract of fragments of a shiitake mushroom, kneading the mixture of the cyclodextrin solution and the shiitake mushroom extract to afford a cyclodextrin clathrate and drying and pulverizing the cyclodextrin clathrate. The powdery extract of a shiitake mushroom thus obtained contains all the active ingredients, such as physiologically active substances that are present in the hot water extract of the shiitake mushroom, and in such a condition that the active ingredients are clathrated in the cyclodextrin stably.

4 Claims, No Drawings

PROCESS FOR PREPARATION OF POWDERY EXTRACT OF SHIITAKE MUSHROOM

FIELD OF THE INVENTION

This invention relates to a process for preparation of a powdery extract of shiitake mushroom, the scientific name of which is *Cortinellus shiitake*. More particularly, this invention relates to a process for powdering an extract of shiitake mushroom that is obtained by subjecting shiitake mushroom used as food to hot water extraction treatment and concentrating the hot water extract.

BACKGROUND OF THE INVENTION

Various kinds of uses of chlorella algae in the production of food and feeds have been proposed so far. Japanese Patent Publication for Opposition (Kokoku) No. 7-22494 discloses a process comprising the steps of adding water to a powdered shiitake mushroom in an amount of at least four times as much as the amount of the powdered shiitake mushroom, mixing these materials, heating the mixture slowly at temperatures of 45°–120° C. for 5–7 hours, filtering off the residue to obtain a hot water extract, graduating the hot water extract, adding cyclodextrin (hereinafter referred to as "CD") to the graduated extract, kneading these materials to afford a clathrate, and then drying and pulverizing the clathrate to powder.

The present inventor conducted an intensive study for obtaining a shiitake extract that can keep water-soluble active ingredients contained therein in a more stable condition. As a result, he has achieved the present invention.

SUMMARY OF THE INVENTION

This invention provides a process for preparation of a powdery extract of shiitake mushroom comprising the steps of suspending a shiitake mushroom powder in water to form a suspension, subjecting the suspension to heat extraction at 80°–90° C. for 30–60 minutes to obtain a hot water extract, concentrating the hot water extract by a factor of two to five, adding a CD solution to the concentrated extract to afford a mixture, kneading the mixture under reduced pressure at 60°–90° C. for 10–24 hours to obtain a CD clathrate and drying and pulverizing the clathrate.

In the present invention, when the shiitake mushroom powder is suspended, preferably 500 to 1000 parts by volume of water is used, based on 10 to 50 parts of the shiitake mushroom powder. One to ten parts by weight of the CD solution is preferably used, based on 100 parts by weight of the two- to five-fold concentrated extract.

In one embodiment of the process according to the present invention, the shiitake mushroom powder in an amount of 10–50 kg is suspended in 500 to 1000 liters of water at 80°–90° C. for 30–60 minutes for extraction treatment. The thus obtained hot water extract is concentrated by a factor of two to five. The CD solution is added in an amount of 1 to 10 kg to 100 kg of the two- to five-fold concentrated extract. These materials are kneaded under reduced pressure of 300–500 mmHg at 60°–90° C. for 10–24 hours to obtain a CD clathrate. The CD clathrate is dried and pulverized to afford a powdery extract of shiitake mushroom. When 10–50 kg of the shiitake mushroom powder is subejected to extraction treatment, if water is used in an amount of less than 500 liters, it is difficult to extract the active ingredients from the powder because the mixture becomes slurry-like owing to the strong water absorption properties of the powder. In contrast, if water is used in an amount of more than 1000 liters, this is uneconomical although the active ingredients can be sufficiently extracted from the powder. The reason the two- to five-fold concentrated extract and the CD solution are kneaded under reduced pressure of 300–500 mmHg at 60°–90° C. for 10–24 hours is that by such conditions, a clathrate including only polysaccharides present in the shiitake mushroom extract without including monosaccharides or disaccharides can be formed.

In the present invention, a CD solution is preferably prepared, for example, by adding 1–40 parts by weight, for example, 1–40 kg of CD to 100 parts by weight, for example, 100 kg of water. The saturated CD solution at 90° C. contains CD in an amount of 40% of the total weight of the solution. A CD solution having at least 10% CD concentration is required for clathration of the two- to five-fold concentrated shiitake mushroom extract. Thus, in this embodiment of the present invention, the range of the CD content in the CD solution is determined as that of 10–40%.

Examples of CD include α-CD, β-CD, γ-CD and CD konaame (powdered candy of CD). Preferably, β-CD is used in the present invention. The CD clathrate of the present invention is preferably dried by freeze-drying or heat-drying.

DETAILED DESCRIPTION OF THE INVENTION

EXAMPLE 1

Dried shiitake mushroom fragments in an amount of 40 kg was added to 600 liters of water. The mixture was subjected to extraction treatment at 85° C. for 60 minutes and the residue was filtered off to obtain a hot water extract. The extract was concentrated by a factor of three to afford a shiitake mushroom extract. To 100 kg of the thus obtained extract was added 10 kg of a CD solution. These materials were kneaded for 18 hours at 85° C. under the reduced pressure of 500 mmHg to afford a clathrate. The clathrate was freeze-dried and ground to obtain a powdery shiitake mushroom extract.

In accordance with the present invention, a shiitake mushroom extract which contains various kinds of physiologically active ingredients such as polysaccharides in large quantities has been obtained in the form of a powder. This extract can be used not only in the form as it is, but also in the form of granules having suitable size. The extract can easily be added to beverages such as teas, seasonings and the other food.

What is claimed is:

1. A process for preparation of a powdery extract of a shiitake mushroom comprising:

suspending 10–50 parts by weight of a shiitake mushroom powder in 500–1000 parts by weight of water to form a suspension;

subjecting the suspension to heat extraction at 80°–90° C. for 30–60 minutes to obtain a hot water extract;

concentrating the hot water extract by a factor of two to five;

adding 1–10 parts by weight of a cyclodextrin solution to 100 parts by weight of the two- to five-fold concentrated extract to produce a mixture;

kneading the mixture under reduced pressure at 60°–90° C. for 10–24 hours to produce a cyclodextrin clathrate; and drying and pulverizing the clathrate.

2. A process according to claim 1, wherein said reduced pressure is 300–500 mm Hg.

3. A process according to claim 1, wherein said cyclodextrin is β-cyclodextrin.

4. A process according to claim 1, wherein said cyclodextrin clathrate contains no monosaccharides or disaccharides from the shiitake mushroom extract.

* * * * *